United States Patent [19]

Kennedy et al.

[11] 4,211,263
[45] Jul. 8, 1980

[54] DUAL FILL RATE LIQUID FILLER APPARATUS HAVING A SINGLE CONTROL VALVE

[75] Inventors: Harry L. Kennedy; Prakash M. Kesaree, both of Freeport; Robert H. Reeves, Jr., Lake Jackson, all of Tex.

[73] Assignee: Velasco Scale Company, Houston, Tex.

[21] Appl. No.: 951,991

[22] Filed: Oct. 16, 1978

[51] Int. Cl.³ .............................................. B65B 3/28
[52] U.S. Cl. .................................... 141/83; 141/128; 177/122
[58] Field of Search .................. 137/403; 141/83, 128; 177/122; 222/70, 77

[56] References Cited

U.S. PATENT DOCUMENTS

| 3,509,954 | 5/1970 | Sramick | 141/128 X |
| 3,708,026 | 1/1973 | Senour | 177/122 X |
| 4,040,496 | 8/1977 | Wilson | 177/122 X |

*Primary Examiner*—Frederick R. Schmidt
*Attorney, Agent, or Firm*—Arnold, White & Durkee

[57] ABSTRACT

A liquid filler apparatus useful in connection with the filling of a container with a predetermined weight of liquid at a first and a second fill rate is characterized by a single control valve having either a ball-type or a butterfly-type valve element interposed in a flow control relationship between a source of liquid and a conduit insertable into the container to be filled. The control valve responds to signals functionally related to the weight (and therefore the volume) of the liquid within the container generated from a scale element to fill the container at different fill rates. An interface arrangement responsive to the signals generated by the scale is operatively associated with the control valve actuator to impose an actuating force on the valve element sufficient to open the valve element to define a first and a second flow cross-section to thereby permit liquid flow therethrough at the first and the second fill rates, respectively.

9 Claims, 8 Drawing Figures

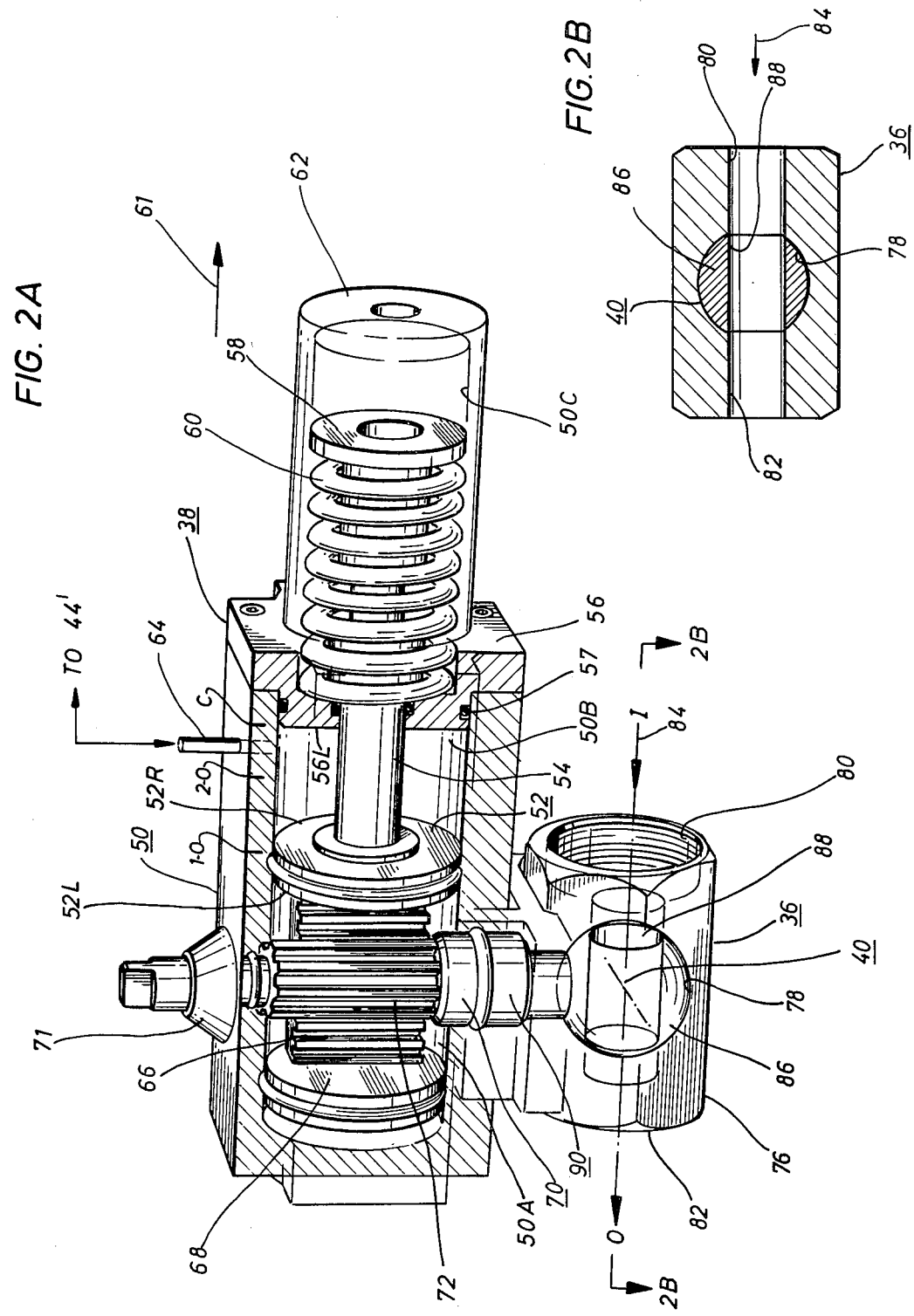

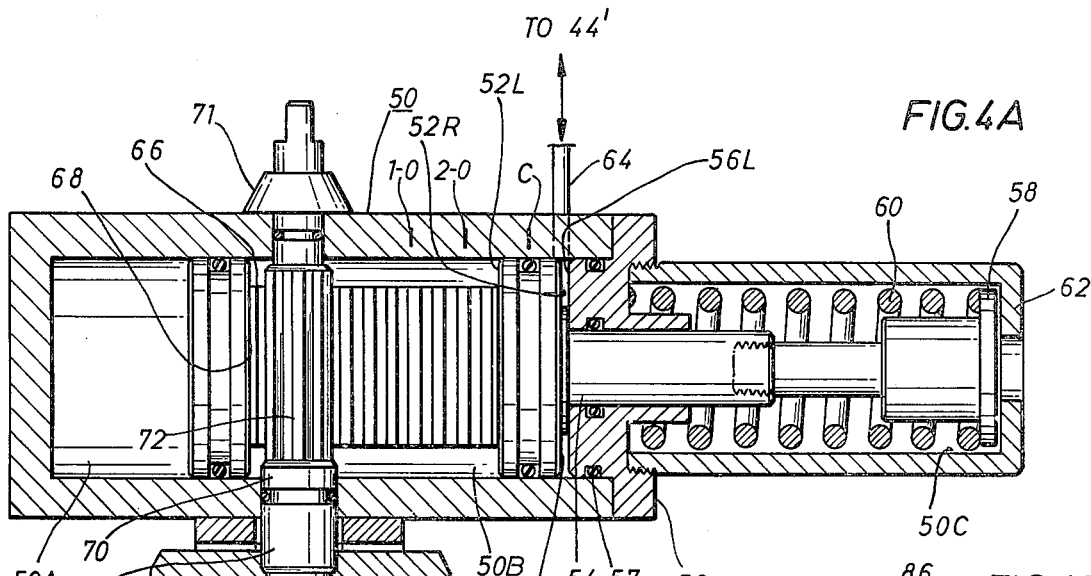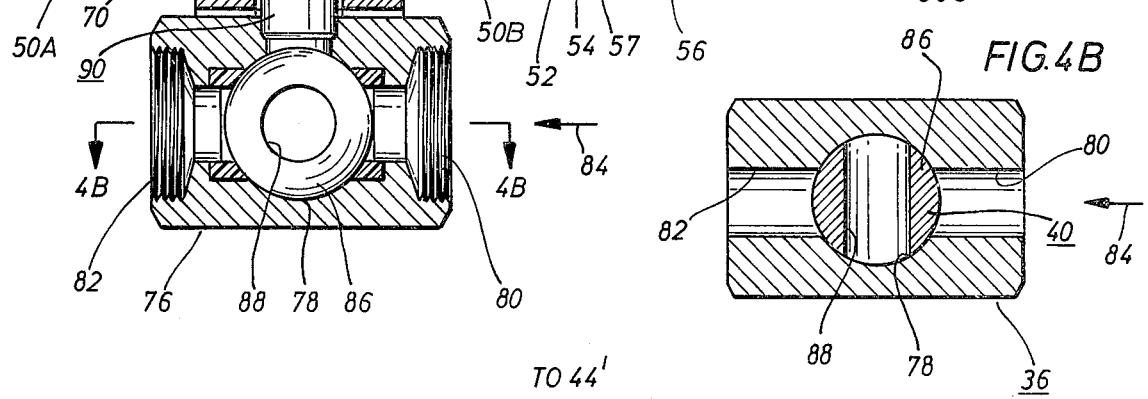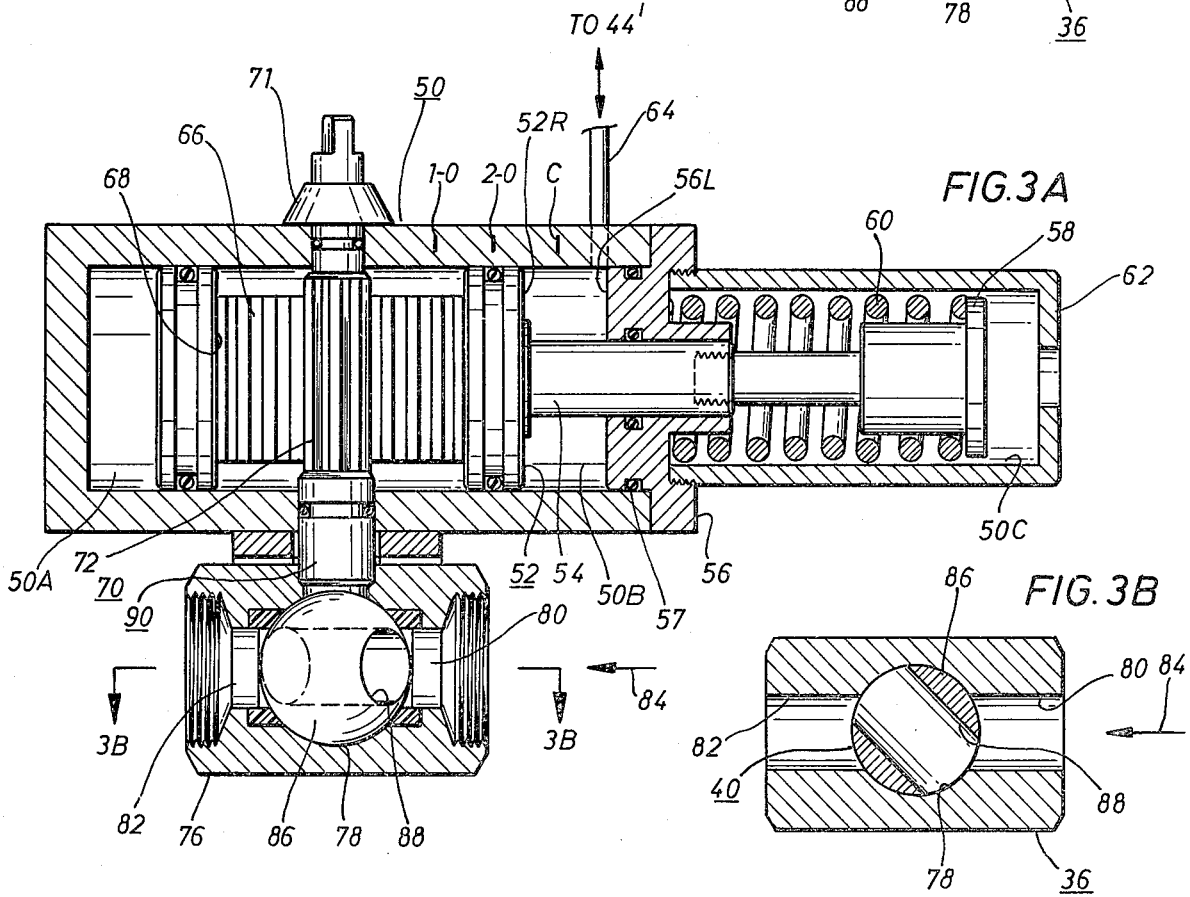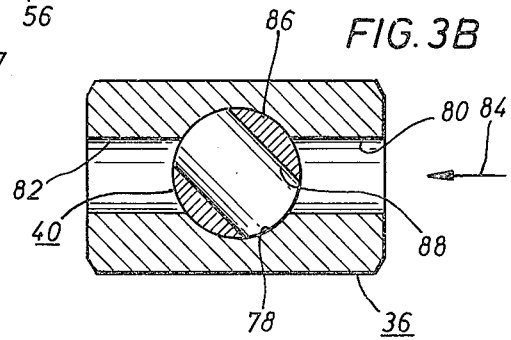

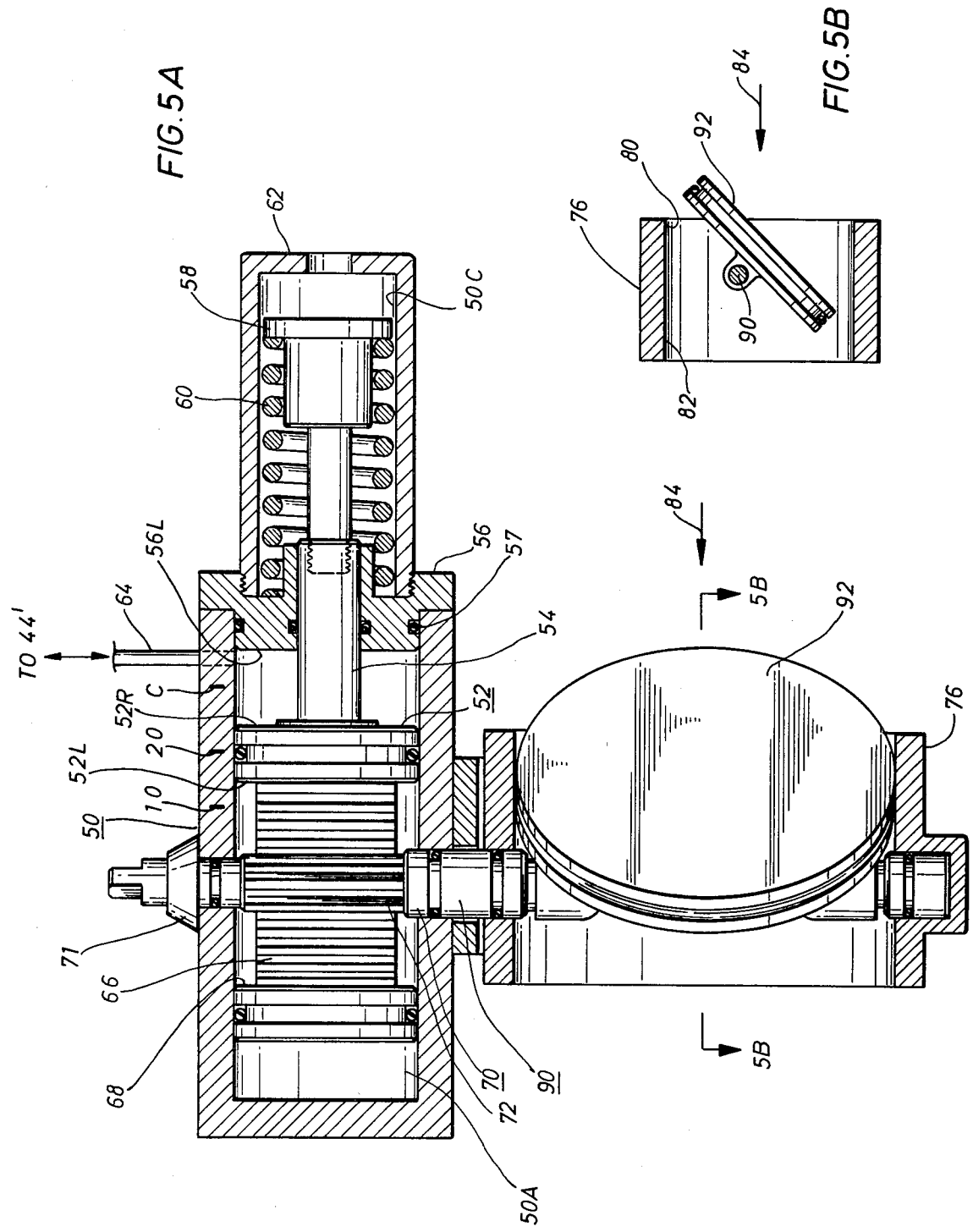

DUAL FILL RATE LIQUID FILLER APPARATUS HAVING A SINGLE CONTROL VALVE

BACKGROUND OF THE INVENTION

1. Field of the Invention

This invention relates to apparatus for filling containers with a liquid, and more particularly, to a liquid filler apparatus using a single control valve having either a ball-type or a butterfly-type valve element.

2. Description of the Prior Art

For reasons of economy, it is desirable to automatically control the introduction of liquid into containers which may range in size from a few ounces to many gallons.

In order to accurately fill a container with liquid in the quickest and most efficient manner, it is the practice in the art to introduce liquid into that container at a relatively high filling rate. When a predetermined weight of liquid has been introduced into the container being filled, the remaining portion of the liquid is admitted to the container at a slower fill rate. For apparent reasons, the first filling rate is known in the art as "fast fill" while the second filling rate has been termed "dribble fill". Of course, when the desired weight of liquid has been introduced into the container the dribble fill is terminated.

The cut-off points wherein changeover from fast fill to dribble fill and the termination of dribble fill occur is usually governed by feedback control signals generated by a scale arrangement upon which the container is disposed. First and second cut-off weights each representative of a predetermined weight within the container are used as set points for the changeover from fast fill to dribble fill and for the termination of dribble fill, respectively.

In the prior art, introduction of liquid into a container at both a fast fill rate and a dribble fill rate may be achieved through the use of a parallel arrangement of valves for dispensing liquid into the container. This parallel valve arrangement is located in the flow path intermediate the source of liquid and the container. To achieve a fast fill rate, the valves in each of the two parallel branches are both opened. Dribble fill rate is achieved by closure of the valve in one of the branches. Usually, the valve left open during dribble fill passes a flow rate less than that passed through the valve disposed in the other of the parallel branches. To terminate filling of the container, the valve in the second parallel branch is closed.

It is possible to use a control valve having a low cv factor to control the introduction of liquid to the container. Yet another alternative is to use a specially designed two-stage valve with a high cv factor. Of course, the disadvantage with both of these last-mentioned alternatives is high cost.

The liquid is usually introduced into the container through an elongated conduit or "lance" which may extend into the interior of the container. In connection with the filling of containers with certain liquids, such as detergents, a certain precautionary technique, known as "subsurface fill" must be taken to avoid foaming of the liquid, to prevent generation of fumes and noxious odors, as well as to prevent ignition of the material by accumulated static charges.

To effect a subsurface fill of a container the conduit or lance is inserted into the volume of the container for a distance such that the emission end of the conduit is disposed just above the bottom of the container. The liquid is then introduced into the container at a dribble fill rate until there is a level of liquid disposed within the container such that the emission end of the lance lies below the surface of the liquid. At this point, the liquid may be introduced at a fast fill rate until the changeover cut-off weight (i.e., volume) is reached. At this point, the dribble flow rate is used to bring the volume of liquid introduced into the container to the desired weight.

Subsurface filling arrangements usually utilize a primary and a secondary valve. The primary valve is located at a point on the lance outside of the container. The secondary valve is connected in the fluid flow path adjacent the emission end of the lance. The secondary, or dribble fill control valve, is usually operated by a rod extending through the interior of the lance. The dribble fill valve is moved with respect to the emission end of the lance to define fast fill and dribble fill positions by an actuator connected to the rod. The dribble fill valve is also used to prevent drips.

When using a subsurface filling arrangement such as discussed above, it is necessary to provide some apparatus to withdraw the lance from the container as the level of liquid in the container rises. This is necessary in order to provide an accurate measurement of the weight of the liquid introduced into the container.

It is believed to be advantageous to provide a single flow control valve having either a ball-type or a butterfly-type valve element in a flow control relationship within the conduit or in a position controlling the rate of liquid passing through the conduit at a location on the filling arrangement which at all times remains external to the container being filled.

It is also believed of advantage to provide a control valve having an actuator in cooperative association with the valve elements and responsive to the control signals generated by the scale such that the imposition of actuating forces to the actuator varies the effective cross-section flow area through the conduit in accordance with the actuating force to thereby provide both fast fill and dribble fill liquid flows through the conduit.

It is believed to be advantageous to provide a liquid filling arrangement using a control valve element of the ball-type or butterfly-type in cooperative association with a pressure actuator to control the introduction of a liquid into a container at a fast fill rate and at a dribble fill rate. It is also believed advantageous to provide a liquid filling arrangement such that the lance or conduit need not be withdrawn as the liquid level within the container rises during the practice of subsurface filling techniques.

SUMMARY OF THE INVENTION

This invention relates to apparatus for filling a container with a liquid at first and second liquid fill rates wherein a single control valve of the ball-type or the butterfly-type is used in a flow control relationship within a conduit such that the imposition of actuating forces into a valve actuator associated with the control valve element varies the effective cross section of the conduit through which liquid may pass to accurately provide both fast fill and dribble fill rates of liquid through the conduit. The actuating forces may be imposed upon the actuator in accordance with this invention through an interface arrangement operatively associated with a scale and responsive to first and second control signals output from the scale to vary the effective flow cross section through the conduit in accordance with the weight, and therefore, the volume, of liquid within the container.

The valve actuator may typically take the form of a spring biased piston-cylinder arrangement wherein the piston is movable in response to an actuating fluid pressure against the bias of the spring. The cross section area of the opening in the control valve element can be varied by varying the actuating fluid pressure against the spring. The interface arrangement may include first and second valves responsive to the control signals from the scale and an initiating signal and is thereby adapted to apply actuating fluids at a first and a second predetermined actuating pressure into the valve actuator to effect the opening of the ball or butterfly valve element to define the predetermined flow cross section within the conduit. A delay timer is provided whereby the actuator is vented between introduction of actuating fluid at the first and second pressures.

BRIEF DESCRIPTION OF THE DRAWINGS

The invention will be more fully understood from the following detailed description thereof taken in connection with the accompanying drawings which form a part of this application and in which:

FIG. 2A is a perspective view of a ball-type control valve and actuator therefor useful in connection with the filling apparatus shown in FIG. 1 with the ball element in the first open (fully open) position;

FIG. 2B is a sectional view of the ball-type control valve taken along section lines 2B—2B in FIG. 2A;

FIGS. 3A and 4A are, respectively, elevational sectional views of the ball-type control valve shown in FIG. 2A, with the ball valve element occupying the second open (partially open) position and the fully closed position;

FIGS. 3B and 4B are, respectively, sectional views of the ball-type control valve taken along section lines 3B—3B in FIG. 3A and section lines 4B—4B in FIG. 4A;

FIG. 5A is an elevational view of a butterfly-type control valve and actuator therefor useful in connection with the filling appartus of FIG. 1 with the butterfly valve element in the second open (partially open) position;

FIG. 5B is a sectional view of the butterfly-type control valve taken along section lines 5B—5B in FIG. 5A; and, FIG. 6 is a schematic diagram of an interface arrangement operatively associated with the valve actuator by which actuating forces may be imposed on and applied to the actuator in accordance with this invention.

DESCRIPTION OF THE PREFERRED EMBODIMENT

Figure 1:
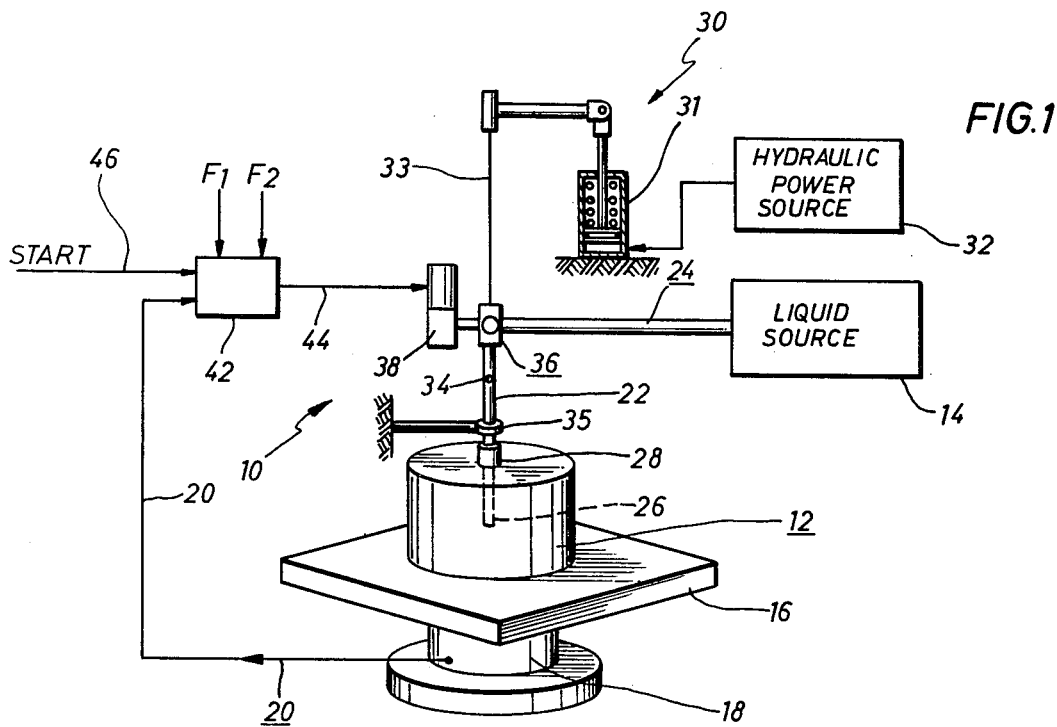
FIG. 1 is a highly stylized pictorial representation of a liquid filling apparatus in accordance with this invention.

Throughout the following description, similar reference numerals refer to similar elements in all Figures of the drawings.

Referring first to FIG. 1, shown is a highly stylized diagramatic representation of an apparatus generally indicated by reference numeral 10 for filling a container 12 with liquid from a liquid source 14. The source 14 may be disposed under pressure, if desired. The container 12 is supported on a suitable base 16 associated with a scale 18 adapted to generate control signals representative of the weight of the liquid in the container 12 as the container 12 is filled by the apparatus 10. The scale 18 may be any suitable mechanical or electrical scale element adapted to generate control signals to be described herein on output lines diagramatically illustrated by reference numeral 20. For example, a suitable scale 18 may be that sold by Berkel under model No. 76L.

In accordance with the invention, the container 12 is filled with liquid from the source 14 at a first fill rate until a predetermined weight of liquid (corresponding to a first volume of liquid) is disposed within the container 12. Thereafter, liquid is introduced into the container 12 at a second fill rate until a second predetermined weight of liquid (corresponding to a second volume of liquid) has been introduced into the container 12.

The scale 18 is operative to generate first and second control signals output on the lines 20 when the weight of the liquid therein (or, of course, the weight of the liquid and the container) reaches or is functionally related to predetermined first and second cut-off weights of liquid within the container 12. The container 12, which may range in size from several ounces through standard drum size and beyond, is brought into the loading position on the base 16 by any suitable conveyor or container handllng system (not shown). A filling apparatus 10 in accordance with this invention includes a conduit, or "lance" 22 connected through any well-known piping arrangement schematically indicated by reference character 24 to the liquid source 14. The conduit 22 terminates in an emission orifice 26 through which liquid from the source 14 is discharged into the container 12 at a predetermined fill rate controlled in accordance with the teachings of this invention.

It may be desired to raise and to lower the conduit 22 into and out of a filling bung 28 or other suitable inlet orifice disposed on the container 12 or to otherwise vary the location of the emission orifice 26 with respect to the bottom of the container 12. To effect this purpose any suitable lifting arrangement generally indicated by reference numeral 30 in FIG. 1 may be used. For example, a pneumatic cylinder 31, deriving lifting pressure from any suitable hydraulic source 32 may be operatively associated through a connection (shown schematically at 33) to the conduit 22. It is, of course, appreciated that any alternative well-known expedient may be utilized as the lifting arrangement and connection therefor. It is, of course, also understood that the conduit 22 and emission orifice 26 may be fixed in space with respect to the filling bung 28 or inlet orifice of the container 12. A vent opening 34 is provided in the lance 22 at any convenient location thereon. A wiper 35 is fixed in stationary relationship about the lance 22 to remove liquid which may adhere to the lance and return that liquid to the container 12.

The conduit 22 may be of any predetermined length dictated by the size of the container 12 and by the nature of the liquid being introduced thereinto. For example, the conduit may be provided in a length sufficient to extend through the filling bung 28 to a position just above the bottom of the container 12. Such a disposition is usually advantageous, as discussed above, when a liquid has a tendency to foam or emit noxious odors unless introduced into the container 12 using a subsurface fill technique. Of course, in such a situation, a lifting arrangement 30 must be provided in order to lower the conduit 22 and the emission orifice 26 thereof into the container 12 to the desired operating position and to retract the conduit 22 therefrom when the filling operation is complete. It is to be understood that when the filling apparatus 10 embodying the teachings of this invention is utilized for the practice of subsurface filling technique the conduit 22 need not be withdrawn simultaneously with the rising level of liquid within the container 12.

In any event, whether using the subsurface fill technique or, whether utilizing a technique whereby the emission orifice 26 is disposed just within the container 12 below the filling bung 28 or, whether using a technique whereby the filling bung 28 is disposed just beneath the emission orifice 26 of the conduit 22, any suitable arrangement may be used to orient the filling bung 28 in vertical alignment beneath the conduit 22. For example, the locating arrangement disclosed and claimed in U.S. Pat. No. 3,993,199, assigned to the assignee of the present invention, may be conveniently used to locate the bung 28 with respect to the conduit 22.

In accordance with this invention, a single control valve 36 having an actuator 38 operatively associated therewith may be disposed in any convenient flow control relationship intermediate the source 14 and the emission orifice 26 of the conduit 22. As is discussed in connection with FIGS. 2 through 5, the control valve 36 includes a valve element 40 (not shown in FIG. 1) of either the ball-type or of the butterfly-type. In accordance with this invention, the valve element 40 is movable from a closed to either a first open position or to a second open position wherein the valve element respectively defines first and second liquid flow cross section areas sized to permit a liquid to pass from the source 14 through the conduit 22 and into the container 12 at a first and a second fill rate. In a manner to be described fully herein, the valve element 40 usually is moved in response to an initiating signal (START) from the closed position (shown in FIGS. 4A and 4B) to the first open (fully open) position (shown in FIGS. 2A and 2B) to introduce liquid into the container at a first fill rate, usually corresponding to a fast fill rate, until a predetermined weight of liquid is disposed within the container 12. At that point, the weight of the liquid within the container 12 equals (or is functionally related to) a first cut-off weight and a first control signal is generated from the scale 18 on an appropriate one of the output lines 20. The valve element 40 is responsive to the first control signal to move to the second open (partially open) position (shown in FIGS. 3A, 3B, 5A and 5B) to introduce liquid into the container 12 at the second fill rate, usually corresponding to a dribble fill rate, until the weight of the liquid in the container 12 equals (or is functionally related to) a second cut-off weight. At this point, a second control signal is output from the scale 18 on one of the output lines 20. Of course, as will be apparent from the teachings of this application, the first fill rate may be greater or less than the second fill rate, dependent upon the necessities of the particular filling task being undertaken.

The actuator 38 operatively associated with the valve element 40 disposed within the valve 36 is responsive to first and second actuating forces imposed thereon to move the valve element 40 against a biasing force to the first open position and then responsive to a second actuating force imposed thereon to move the valve element against the biasing force to the second open position. An interface arrangement generally indicated by reference numeral 42 is operatively associated with the scale 18 and is responsive to the control signals on the output lines 20 from the scale 18 to apply the first and the second actuating forces on the actuator 38. The interface 42 is connected by a suitable force transmitting connection 44 to the actuator 38.

In response to an initiating signal either manually or automatically provided to the interface 42 on the START line, a first actuating force diagramatically illustrated $F_1$ is transmitted to the actuator 38 to move the valve element 40 to the first open position to permit introduction of liquid into the container 12 at the first-fill rate. The first open position is maintained until the first control signal is generated, this event being representative of the first cut-off weight being reached. The interface 42 is responsive to the first control signal to terminate application of the first actuating force $F_1$ and to apply the second actuating force $F_2$ on the actuator 38 to move the valve element 40 to the second open (partially open) position to permit introduction of liquid into the container 12 at the second fill rate. The second open position is maintained until the second control signal is generated. The interface is responsive to the second control signal (representative of the second cut-off weight being reached) to terminate application of the second actuating force $F_2$ to the actuator 38.

In general, when the actuating forces are terminated the biasing force becomes dominant, and closes the valve element 40. As is discussed herein, in the case of a ball valve, the valve element may close in response to the biasing force after the first actuating force $F_1$ is removed and before the second actuating force $F_2$ is applied as well as after removal of the second actuating force. In the general case, $F_1$ or $F_2$ may be applied in any desired order.

With reference now to FIGS. 2 through 5, respectively shown are views of a control valve 36 having a ball-type valve element 40 and actuator 38 (FIGS. 2A through 4B) and a control valve having a butterfly-type valve element 40 and actuator 38 (FIGS. 5A and 5B). Since the actuators 38 are functionally identical for both the ball-type valve element and the butterfly-type valve element, the structural details of the actuator are discussed first. It is noted that an actuator suitable for use in connection with this invention and substantially similar in operating principles to the actuator shown in the Figures may be obtained from Gemini Valve Company, under Model No. 1 1/2-96-6-RT-6-422 SR.

As seen from the Figures, the actuator 38 includes a substantially rectangular housing generally indicated by reference numeral 50 having defined therein a shaft compartment 50A, a fluid-tight cylinder compartment 50B, and a spring housing compartment 50C. Movably disposed within the cylinder compartment 50B is an actuator piston 52 having a piston rod 54 extending substantially axially of the cylinder compartment 50B and extending through a partition 56 into the spring housing compartment 50C. Suitable seals 57 are, of course, provided about the shaft 54 as it passes through the partition 56. A spring retainer 58 is fixedly mounted to the portion of the piston rod 54 disposed within the spring compartment 50C of the housing 50. A biasing spring 60 is mounted between the spring retainer 58 and the partition 56. The spring 60 imparts a biasing force acting in the direction of reference arrow 61 tending to maintain the piston 52 in the position within the cylinder compartment 50B indicated on the drawings by reference character C. As is discussed herein and as illustrated in FIGS. 4A and 4B, with the piston 52 responding to the force of the bias spring 60 and occupying the position C, the ball valve element 40 associated with the valve 36 is in the closed position.

The cylinder compartment 50B cooperates with piston face 52R and the opposed surface 56L of the partition 56 to define a substantially fluid-tight cylinder volume communicating with a fluid manifold 64. The fluid manifold is, in the embodiment of the invention shown in FIGS. 2 through 5, connected to an actuating conduit 44'. The actuating conduit 44' comprises the force transmitting connection 44 between the valve actuator 38 and the interface 42 in the embodiment of the invention shown in FIGS. 2 through 5.

The opposite surface 52L of the piston 52 is provided with an axially extending gear rack 66. The gear rack 66 is supported at its distal end from the piston 52 by a support disc 68, disposed within the shaft compartment 50A of the housing 50.

Rotatably disposed within the shaft compartment of the housing 50 about an axis transverse to the axis of the piston rod 54 is a shaft 70. The shaft 70 is mounted for rotational movement with respect to the housing 50 on any suitable bearing arrangement. A closure indicator 71 may be provided to the external projecting end of the shaft 70, if desired. The shaft 70 has a pinion gear 72 mounted thereon. The pinion gear 72 is disposed in mating relationship with the rack 66. It may be appreciated that axial movement of the piston 52 (along the axis of the rod 54) within the cylinder compartment 50B displaces and the gear rack 68 thereon which, due to its interconnection with the pinion 72, operates to drive the shaft 70 about its axis of rotation.

With reference now to FIGS. 2A through 4B, the valve 36 there shown is a ball-type valve such as that manufactured by Gemini Valve Company and sold under the model number cited above. The valve 36 includes a housing 76 having a valve chamber 78 therein. A valve inlet port 80 and outlet port 82 communicate with the valve chamber to permit liquid flow in the direction of reference arrow 84.

In the case of a ball-type valve as shown in FIGS. 2A through 4B, the valve element 40 comprises a substantially spherical member 86 having a bore 88 extending therethrough. The spherical member 86 is provided with a shaft 90 which is coupled to the shaft 70 for rotation therewith.

As may seen with reference to FIGS. 4A and 4B, with the piston 52 occupying the position within the cylinder compartment 50B demarcated by reference character C, the spherical valve element 40 is oriented within the valve chamber 78 such that the bore 88 is isolated from communication with the inlet and outlet ports 80 and 82, respectively. However, with the piston 52 displaced so as to occupy the position within the cylinder compartment 50B indicated by reference character 1-0 (FIGS. 2A and 2B) the rack 66 has been displaced and has engaged the pinion 72 so as to rotate the conjoined shafts 70 and 90 to orient the ball element 86 such that the full dimension of the bore 88 is in communication with the inlet and outlet ports 80 and 82. It may thus be appreciated that with the ball element 86 in the first open (fully open) position shown in FIGS. 2A and 2B, the full cross section area of the bore 88 is in communication with the inlet and outlet ports 80 and 82, respectively, to define a liquid flow path therebetween.

It may be appreciated that with the valve element connected as shown in FIG. 1 intermediate the source 14 and the emission orifice 26 of the conduit 22, liquid is permitted to pass at a first predetermined fill rate into the container 12. Since the full cross section area of the bore 88 is presented in liquid communication with the inlet and outlet ports, the maximum fluid flow, or fast fill rate, through the valve 36 is permitted.

With reference now to FIGS. 3A and 3B, displacement of the piston 52 within the cylinder compartment 50B in response to the introduction of a pressurized fluid into the region between the face 52R of the piston and the surface 56L of the partition 56 to a position indicated by reference character 2-0 imparts a rotation to the conjoined shafts 70 and 90 sufficient to rotate the ball valve element 86 to place a portion of the through bore 88 into liquid communication with the inlet and outlet ports. It may be appreciated with reference to FIGS. 3A and 3B that with the piston 52 in the position indicated by character 2-0, a second predetermined cross section area of the bore 88 (less than the full dimensional area of the bore 88) is presented to the inlet and outlet ports to define a liquid conduction path adapted to permit a flow rate through the valve. This flow rate is less than the flow rate permitted with the piston occupying the position indicated by reference characters 1-0. Thus, it may be appreciated that with the piston in the second open position (FIGS. 3A and 3B), the valve 36 permits a fill rate therethrough less than the fill rate permitted with the piston in the first open, (full open) position.

With reference to FIGS. 5A and 5B, an alternative embodiment of the invention is shown in which the valve element 40 takes the form of a butterfly-type valve element 92 having a shaft 90 connected as illustrated in FIG. 5A. In analogous manner to the situation defined in connection with FIGS. 3 and 4, it may be appreciated that displacement of the piston 52 in response to the application of first and second actuating forces thereto against the bias of the spring 60 opens the butterfly valve element 92 to present first and second cross section areas to permit first and second fluid flows through the valve 36. In FIG. 5, the butterfly-type valve element is shown as opened to the second open (partially open) position, with the piston 52 occupying the position 2-0 with respect to the cylinder compartment 50B.

Figure 6:
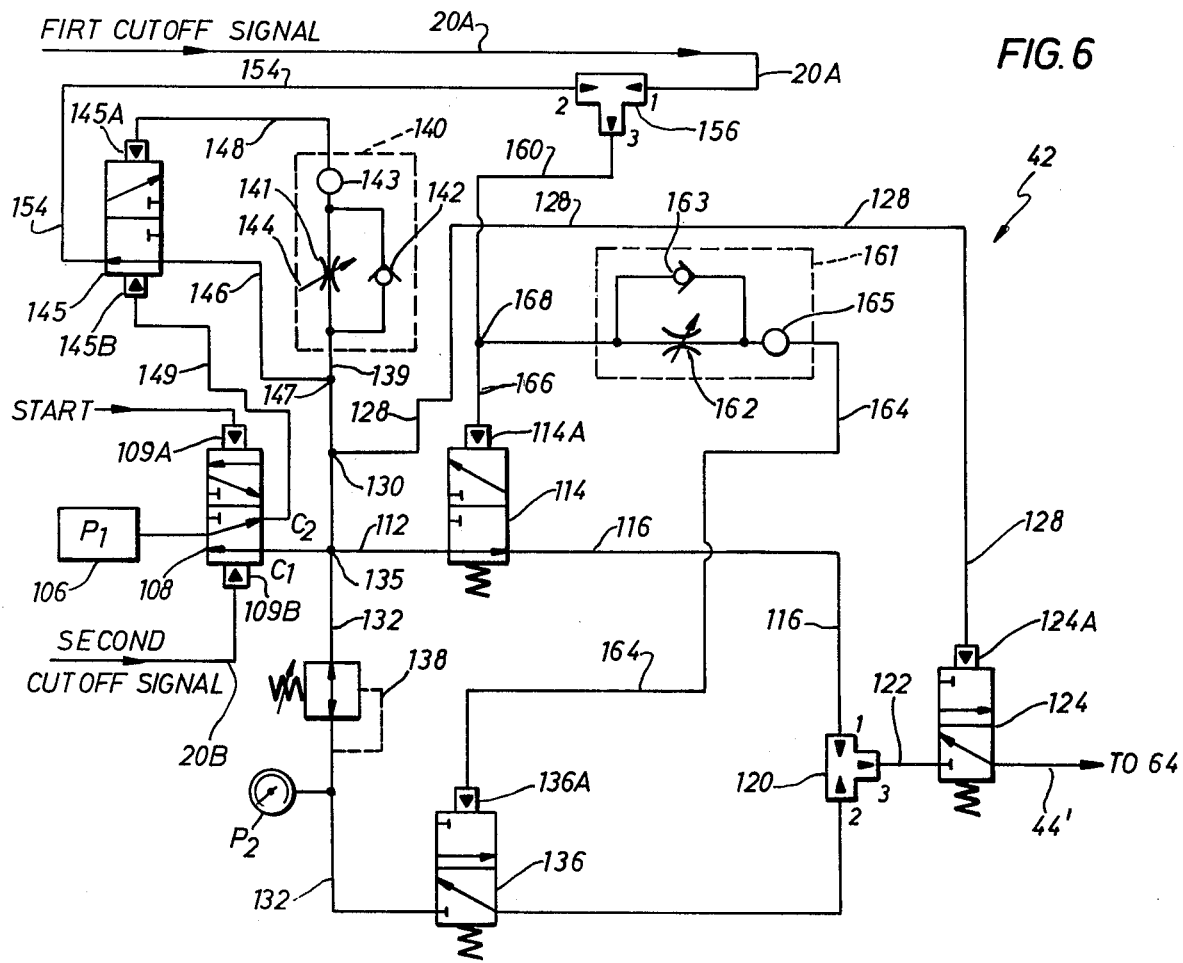

With reference now to FIG. 6 a schematic diagram of a preferred form of interface arrangement 42 disposed between the first and second actuating forces $F_1$, $F_2$ and the force transmitting connection 44 is shown. The interface arrangement 42 is operatively associated with the scale 18 and responsive to the first and second control signals (as well as the START signal) to apply the appropriate one of the actuating forces $F_1$ or $F_2$ to the actuator 38. As may be appreciated, application of the actuating forces operates to displace the piston 52 within the actuator 38 to open the valve element to present the appropriate cross section area to the liquid flow path from the source 14 through the conduit 24. In the preferred embodiment of the invention, the actuating forces imposed on the actuator 38 are generated by the introduction of a pressurized actuating fluid through the actuating conduit 44' and fluid manifold 64 at the appropriate pressure $P_1$ or $P_2$ into the cylinder compartment 50B. The pressurized fluid $P_1$ or $P_2$, acting over the surface area 52R of the piston 52, generates the appropriate actuating force $F_1$ or $F_2$ on the valve 36.

In FIG. 6 a schematic diagram of a pneumatically actuated interface arrangement 42 useful in connection with the filling apparatus of FIG. 1 is illustrated. In FIG. 6, an appropriate source 106 of pressurized actuating fluid, as pressurized air, exhibiting a pressure of $P_1$ is connected to a five-way valve 108, such as that manufactured by Versa Corporation, and sold under Model No. VKL4202. The pressure $P_1$ is available on either output port $C_1$ or output port $C_2$, depending upon the state of the valve 108. The valve 108 is connected in such a manner as to respond to a pneumatic START signal manually or automatically applied to the valve 108 at a first actuating port 109A. The valve 108 is also adapted to respond to the second cut-off signal, itself a pneumatic signal output from the scale 18 (FIG. 1) applied over line 20B to a second actuating port 109B. The output port $C_1$ of the five-way valve 108 is connected by a main conduit 112 to the inlet port of a normally open valve 114. The outlet port of the valve 114 is connected by a conduit 116 to port 1 of a shuttle valve 120. The output port 3 of the shuttle valve 120 is connected by a conduit 122 to the inlet port of a normally closed pilot valve 124. The outlet port of the valve 124 communicates with the fluid manifold 64 (FIGS. 2 through 5) over the actuating conduit 44'. If desired, the conduit 112 may include a regulator to thereby provide fluid at a suitable pressure to the actuator.

The valves 114 and 124 may be any suitable pilot valves such as those manufactured by Norgren and sold under Model No. H41AA01-HS1-HA1. A shuttle valve such as that manufactured by Mosier Industries, Inc., Dayton, Ohio and sold under model No. PSV-2 may be used as the shuttle valve 120.

A branch conduit 128 is connected to the conduit 112 at a node 130 and delivers pressurized fluid from the outlet of the valve 108 to the actuating port 124A of the valve 124.

A second branch conduit 132 is connected to the outlet of the valve 108 at a node 135 to the inlet port of a normally closed valve 136 which is identical to the valves 114 and 124. The second branch conduit 132 contains a regulator 138 adapted to reduce the pressure of the fluid from the first actuating pressure $P_1$ present at the outlet of the valve 108 to a second, lower actuating pressure $P_2$. The outlet of the valve 136 is connected by a conduit 133 to the inlet of the shuttle valve 120. The valves 114 and 136 define a first, normally open, valve and a second, normally closed, valve, respectively.

A third branch conduit 139 is connected at the node 130 and applies the output $C_1$ of the valve 108 to the input of a delay timer 140. The timer 140 includes a variable restriction 141 which is connected in parallel to a check valve 142 and in series with a volume 143. The setting of the restriction 141 is adjustably controllable by an operator through a control rod 144.

A double piloted valve 145, such as that manufactured by Norgren and sold under Model No. H41AA01-HAO-HAO is connected at its input to the third branch conduit 139 by a line 146. The line 146 is joined to the conduit 139 at a node 147. The first actuating port 145A of the valve 145 is connected to the timer 140, and specifically to the outlet of the volume 143, by a line 148. The second actuating port 145B of the valve 145 is connected to the output port $C_2$ of the valve 108 by a reset line 149. The outlet of the valve 145 is connected by a line 154 to inlet port 2 of a shuttle valve 156. The shuttle valve 156 is identical to the shuttle valve 120, previously identified.

As is made clear herein, the timer 140 and the valve 145 cooperate to define an arrangement whereby an output pulse of a predetermined duration is applied by the line 154 to the shuttle valve 156. The duration of the pulse is adjustably controllable by the appropriate setting of the restriction 141. Of course, it is appreciated that any suitable device may be interconnected between the node 130 and the line 154 to provide an output pulse of appropriate duration. For example, a pulse timer such as that manufactured by Aro Corporation, Bryan, Ohio, and sold under Model No. 59156 may be so utilized. Of course, in this event, the reset line 149 may be omitted.

The outlet port 3 of the shuttle valve 156 is connected by a conduit 160 to a delay timer 161. The delay timer 161 includes a variable restriction 162 connected in parallel to check valve 163 and in series with a volume 165. The output of the timer 161 is connected by a conduit 164 to the actuating port 136A of the valve 136.

The actuating port 114A of the valve 114 is connected by a conduit 166 extending from the output conduit 160 from the shuttle valve 156. The connection of the conduits 160 and 166 is diagrammatically illustrated at a node 168.

Inlet port 1 of the shuttle valve 156 is connected to the pneumatic line 20A from the scale 18 (FIG. 1). The first cut-off signal output from the scale 18 is applied over the pneumatic line 20A to the inlet port 1 of the shuttle valve 156.

In the quiesent state, the pressure $P_1$ is applied through the port $C_2$ of the valve 108 and through the line 149 to the second actuating port 145B of the valve 145 to maintain the valve 145 in the open state. As will be made clear herein, when it is desired to utilize a subsurface fill technique, the timer 140—valve 145 arrangement responds to the START signal to generate an output pulse of a predetermined duration (in accordance with the setting of the restriction 141 by the control rod 144) to close the valve 114 and open the valve 136 to introduce liquid into the container at the dribble fill rate. The sequence of operation is explained in full detail herein.

Having described the preferred embodiment of the filling apparatus including the interface arrangement therefor, the operation thereof is next discussed. It is to be understood, however, that although in the preferred embodiment pneumatic signals are utilized whereby the actuating pressures ($P_1$ or $P_2$) may be applied to the actuator through the actuating conduit 44', a suitable equivalent electrically responsive valving arrangement for use within the interface 42 lies within the contemplation of this invention.

The operation of the device may be explained in connection with two hypothetical filling cycles. In the first hypothetical cycle discussed, it will be assumed that the product to be introduced into the container being filled is not susceptable to foaming and, therefore, does not require the utilization of the subsurface filling technique previously discussed. In such a case, the timer 140—valve 145 arrangement need not be utilized and the rod 144 is set for a pulse duration of zero. That is, the restriction 141 is effectively opened.

If it is desired to fill a container with a predetermined weight of liquid that container need only be appropriately positioned (either manually or automatically) beneath the emission orifice 26 of the lance 22. It is, of course, desired that the liquid be introduced into the container 12 at a fast fill rate until a first cut-off weight of liquid is introduced into the container 12. Thereafter, for accuracy of filling, it is desirable to introduce liquid into the container 12 at a second (slow or dribble) fill rate until the second cut-off or final weight is reached.

With the container 12 appropriately positioned, a START signal is applied either manually or automatically to the actuating port 109A of the five-way valve 108. The valve 108 responds to the START signal applied thereto to connect the outlet port $C_1$ to the source 106 so as to introduce actuating fluid at the first actuating pressure $P_1$ from the source 106 into the conduit 112. The actuating fluid in the conduit 112 is conducted through the normally open valve 114 to the conduit 116 and thence through the shuttle valve 120 and through conduit 122 to the inlet port of the pilot valve 124. Simultaneously with the actuating of the valve 108, fluid at actuating pressure $P_1$ is conducted over the first branch conduit 128 connected at the node 130 and applied to the actuating port 124A of the valve 124. The valve 124 responds to the fluid pressure presented at the actuating port 124A and moves to the open position to thereby place the actuating conduit 44' in fluid communication with the actuating fluid having pressure $P_1$.

This pressurized fluid is introduced through the actuating conduit 44' and the fluid manifold 64 to the cylinder compartment 50B of the actuator. A first actuating force (equal to the pressure $P_1$ multiplied by the surface area 52R of the piston 52) thereby exerts a force against the piston 52 to displace the piston against the bias the spring 60 and to move the piston from the closed position (indicated by C in the drawings) to the first open position (indicated by 1-0 in the drawings). As may be appreciated, this action has the effect of rotating the conjoined shafts 70 and 90 to move the valve element 40 to define a first cross section flow area (in this case, the full cross section flow area within the valve) so as to permit liquid from the source 14 (FIG. 1) to flow at the fast fill rate through the conduit 24, the now fully open valve 36, through the lance 22 and out of the emission end 26 thereof into the container 12.

The described condition prevails until such time as the weight of the liquid thereby introduced at the first fill rate (in this instance, fast fill) has been introduced into the container 12. When the first cut-off weight of liquid within the container 12 is reached, the scale 18 is operative to output a first cut-off signal over line 20A to interface 42. With the occurrence of the first cut-off signal on the line 20A is applied through the shuttle valve 156 to the conduit 160.

The first cut-off signal in the conduit 160 is immediately applied to the actuating port 114A of the valve 114 by virtue of its connection to the conduit 160 through the line 166 at the node 168. As a consequence, the normally open valve 114 is closed. With this occurrence, the conduit 116 is opened to atmosphere through the valve 114. It is noted, however, that the flow of pressurized fluid in the first branch conduit 128 is not interdicted and thus the valve 124 remains in a flow conducting position. Moreover, it is also noted that the presentation of the first cut-off signal in the conduit 160 initiates the delay timer 161, the output conduit 164 of which is connected to the actuating port 136A of the valve 136. However, until the timer times out, the valve 136 remains in its normally closed condition.

Accordingly, it may be appreciated that the flow of pressurized actuating fluid ($P_1$) to the actuator has been interdicted. Thus, the force of the spring 60 may again become dominant to move the valve element from the first open position (indicated in the drawings by character 1-0) to the closed position. The fluid previously introduced into the cylinder compartment 50B is permitted to vent to atmosphere through the actuating conduit 44', through the pilot valve 124, through the conduit 122 and through the shuttle valve 120, through the conduit 116 and thence to atmosphere through the now-vented valve 114. It is noted that the shuttle valve 120 is of the type wherein the previous flow path (that is, between the inlet port 1 and the outlet port 3) remains conductive after the pressurized fluid previously present at the inlet port is removed. In this way, it may be appreciated that the actuator 38 may be vented to momentarily close the signal control valve 36.

Once the timer 161 times out, a pneumatic signal is conducted from the conduit 160, through the conduit 164 and applied to the actuating port 136A of the valve 136. The valve 136 responds to the signal applied at its actuating port and is opened so that actuating fluid at the second pressure ($P_2$) derived through the second branch conduit 132 is introduced into the conduit 133. The presentation of pressure fluid in the conduit 133 to the inlet port 2 of the shuttle valve 120 opens that shuttle valve 120 to permit fluid flow between inlet port and the outlet port. Pressurized fluid at the second pressure $P_2$ is thereby conducted through the conduit 122, through the still open valve 124 and thence into the actuating conduit 44'.

The introduction of actuating fluid at the second pressure $P_2$ into the cylinder compartment 50B of the actuator exerts a second actuating force equal to the product of the pressure $P_2$ multiplied by the surface area 52R of the piston 52 to again displace the piston 52 against the force of the bias spring 60. However, since the actuating pressure $P_2$ is less than the actuating pressure $P_1$, a force is exerted on the piston 52 sufficient to displace that piston to the second open position (partially open, indicated in the drawings by reference character 2-0).

Displacement of the piston 52 within the cylinder compartment 50B of the actuator serves to rotate the conjoined shafts 70 and 90 (through the mated interaction of the gear rack 66 and the pinion 72). The rotation of the conjoined shafts 70 and 90 moves the valve element to the second (partially open) position whereby a second cross section flow area (shown in FIGS. 3A, 3B, 5A and 5B) is presented between the liquid source 14 and the lance 22.

It may be appreciated that liquid flow at a second fill rate (in this case, a dribble fill rate) is permitted between the source 14 and the emission end 26 of the lance 22.

The dribble fill condition described remains assertive until the weight of liquid within the container 12 reaches the second cut-off weight. When the second cut-off weight is reached, the second control signal is applied over the line 20B from the scale 18.

The second cut-off signal is applied to the second actuating port 109B of the valve 108 and has the effect of moving the valve 108 to a venting position, thus interdicting the flow of pressurized fluid from the source 106 to the conduit 112. Interruption of the flow of pressurized fluid as thus described removes the acutating force present at the actuating port 124A of the valve 124 and permits the pilot valve 124 to return to its normally closed position.

The interdiction of the flow actuating fluid to the compartment 50B of the actuator permits that compartment to vent through the actuating conduit 44' and thence to atmosphere through the valve 124. The force of the spring 60 again becomes dominant and the valve element 40 thus returns to the closed position. All of the valves disposed within the interface are likewise returned to their initial states.

Having thus described the operation of the invention in connection with a two-fill rate operation, the operation of the filling arrangement may now be explained in connection with the filling of a container with a liquid, as a detergent, which is susceptable to foaming. As noted above, it is in connection with such liquids that the subsurface fill technique is utilized. To utilize the subsurface fill technique, the timer 140—valve 145 arrangement is adjusted such that a "pre-fill" of appropriate duration will be defined. During the "pre-fill", liquid is admitted into the container 12 at a dribble fill rate until the level of liquid introduced into the container lies above the emission orifice 26 of the lance 22. It will be recalled that to utilize the subsurface filling technique it is necessary that the lance 22 be inserted into the container 12 such that the emission end 26 is disposed within a clearance distance of the bottom of the container 12. Liquid is thereafter slowly admitted into the container 12 until such time that the level of liquid within the container 12 is above the emission orifice 26. Once this condition is prevailing, fast fill may be effected without the danger of foaming.

The control rod 144 of the restriction 141 of the timer 140 is set by the operator to the appropriate setting to provide, on the output line 154, a pneumatic signal of predetermined duration (dependent upon the time necessary to dribble fill to reach a level above the emission orifice 26 of the conduit). With the assertion of the START command, the output port $C_1$ of the valve 108 is connected to the source 106 while the output port $C_2$ (and the reset line 149) is disconnected therefrom. As a result, pressurized fluid at the first actuating pressure $P_1$ is applied through the third branch conduit 139, through the line 146 and the still-open valve 145 to the outlet conduit 154. The pulse signal is applied through the conduit 154, to inlet port 2 of the shuttle valve 156, thence from the outlet port 3 of the shuttle valve 156, and to the conduit 160. The presentation of the pneumatic pressure signal on the line 160 has the same effect as the occurrence of the first cut-off signal on that line. That is, (after a time delay set by the timer 161) the valve 136 is open, while the valve 114 is closed. Thus, pressurized fluid at the second actuating pressure $P_2$ is conveyed through the conduit 132, the valve 136, the conduit 133, the shuttle valve 120 and its associated outlet conduit 122, through the pilot valve 124 and into the actuator. The actuator responds to the actuating pressure $P_2$ applied thereto to open the valve element to define a cross section flow area from the liquid source to the lance adapted to provide a dribble fill rate. The dribble fill continues until the timer 140—valve 145 arrangement times out.

The pressure signal in the third branch conduit 139 is applied to the timer 140 simultaneously with its presentation to the valve 145. Due to the delay action of the timer 140, a pressure signal does not appear on the output line 148 until a predetermined delay time later (as set by the setting on the restriction and corresponding to the "pre-fill" time). When a signal appears on the line 148, this signal is presented to the first actuating port 145A of the valve 145, and that action serves to terminate the presence of the pneumatic signal on the conduit 160. Thus, the valve 114 returns to its normally open condition, the valve 36 returns to its normally closed condition, and the normal cycle (fast fill—dribble fill) discussed above occurs. Upon the occurrence of the second cut-off signal on the line 20B to the valve 108, the pressure $P_1$ is re-applied to the port $C_2$ and the reset line 149, resetting the valve 145 to its quiescent state in preparation for the next fill.

In accordance with this invention it may be appreciated that a single control valve of either the ball-type or the butterfly-type, in connection with an actuator and interface arrangement operatively associated therewith, may be utilized to control both fast fill and dribble fill rates so as to permit both normal filling cycles and subsurface filling cycles.

Having described a preferred embodiment of the invention and discussing in detail the operation thereof, numerous modifications may be effected thereto by those skilled in the art in view of this foregoing description. It is, however, understood that such modifications lie within the contemplation and scope of this invention as defined in the appended claims.

What is claimed is:

1. An apparatus for filling a container to a predetermined weight with a liquid at a first and a second fill rate, the apparatus being of the type having
    (a) a conduit having an emission end adapted to introduce a liquid from a source into the container,
    (b) a scale adapted to generate a first and a second control signal when the weight of the liquid within the container equals a first and a second cut-off weight, respectively, and
    (c) an intiating signal generator for generating an initiating signal to initiate filling of the container, wherein the improvement comprises:
    a single control valve interposed in a flow control relationship between the liquid source and the emission end of the conduit, the control valve being of the type that has a valve element therein that is movable from a closed to a first open position and from the closed to a second open position wherein the valve element respectively defines first and second liquid flow cross section areas, the first and the second cross section areas being respectively sized to pass a liquid from the source through the conduit and into the container at a first and second fill rate;
    an actuator operatively associated with the control valve and responsive to a first and a second actuating force to move the valve element against a biasing force to the first open position and to the second open position, respectively;
    an interface arrangement operatively associated with the scale and adapted to apply the actuating forces to the actuator, the interface arrangement being responsive to the intiating signal to apply the first actuating force to the actuator to move the valve element from the closed to the first open position to permit introduction of liquid into the container at the first fill rate until the first cut-off weight is reached,
    the interface arrangement being responsive to the first control signal to terminate application of the first actuating force to permit the valve element to respond to the biasing force and return to the closed position and to thereafter apply the second actuating force to the actuator to move the valve element from the closed to the second open position to permit introduction of liquid into the container at the second fill rate until the second cut-off weight is reached, the interface being responsive to the second control signal to terminate application of the second actuating signal to the actuator.

2. Apparatus according to claim 1 wherein the control valve has a ball-type valve element therein and wherein the interface arrangement comprises a first, normally open, and a second, normally closed, valve respectively connected to pressurized actuating fluid at a first and a second actuating pressure, actuating fluid at the first actuating pressure being introduced to the actuator through the first valve until the occurrence of the first control signal, the first and the second valves being responsive to the first control signal to respectively close and open to introduce actuating fluid at the second actuating pressure to the actuator until the occurrence of the second control signal.

3. Apparatus according to claim 2 further comprising a delay timer operatively associated with the second valve for delaying the application of the first control signal to the second valve for a time delay sufficient to vent actuating fluid at the first actuating pressure from the actuator prior to the introduction of actuating fluid at the second actuating pressure into the actuator.

4. Apparatus according to claim 2 wherein
the first valve is disposed within a main conduit connected to a source of pressurized fluid at the first actuating pressure,
the second valve is disposed within a branch conduit, the branch conduit being connected to the main conduit at a node intermediate the pressurized fluid source and the first valve, and
further comprising a pressure regulator disposed in the branch conduit intermediate the node and the second valve to generate the second actuating pressure.

5. Apparatus according to claim 2 further comprising a timer responsive to the initiating signal to close the first valve and open the second valve to introduce actuating fluid at the second actuating pressure to the actuator through the second valve for a time corresponding to the duration of the pulse output of the pulse timer.

6. Apparatus according to claim 1 wherein the control valve has a butterfly-type valve element therein and wherein the interface arrangement comprises a first, normally open, and a second, normally closed, valve respectively connected to pressurized actuating fluid at a first and a second actuating pressure, actuating fluid at the first actuating pressure being introduced to the actuator through the first valve until the occurrence of the first control signal, the first and the second valves being responsive to the first control signal to respectively close and open to introduce actuating fluid at the second actuating pressure to the actuator until the occurrence of the second control signal.

7. Apparatus according to claim 6 further comprising a delay timer operatively associated with the second valve for delaying the application of the first control signal to the second valve for a time delay sufficient to vent actuating fluid at the first actuating pressure from the actuator prior to the introduction of actuating fluid at the second actuating pressure into the actuator.

8. Apparatus according to claim 6 wherein
the first valve is disposed within a main conduit connected to a source of pressurized fluid at the first actuating pressure,
the second valve is disposed within a branch conduit, the branch conduit being connected to the main branch conduit at a node intermediate the pressurized fluid source and the first valve, and
further comprising a pressure regulator disposed in the branch conduit intermediate the node and the second valve to generate the second actuating pressure.

9. Apparatus according to claim 6 further comprising a timer responsive to the initiating signal to close the first valve and open the second valve to introduce actuating fluid at the second actuating pressure to the actuator through the second valve for a time corresponding to the duration of the pulse output of the pulse timer.

* * * * *